June 20, 1967 U. J. BEAS 3,326,169
HATCH COVER
Filed July 7, 1965 5 Sheets-Sheet 1
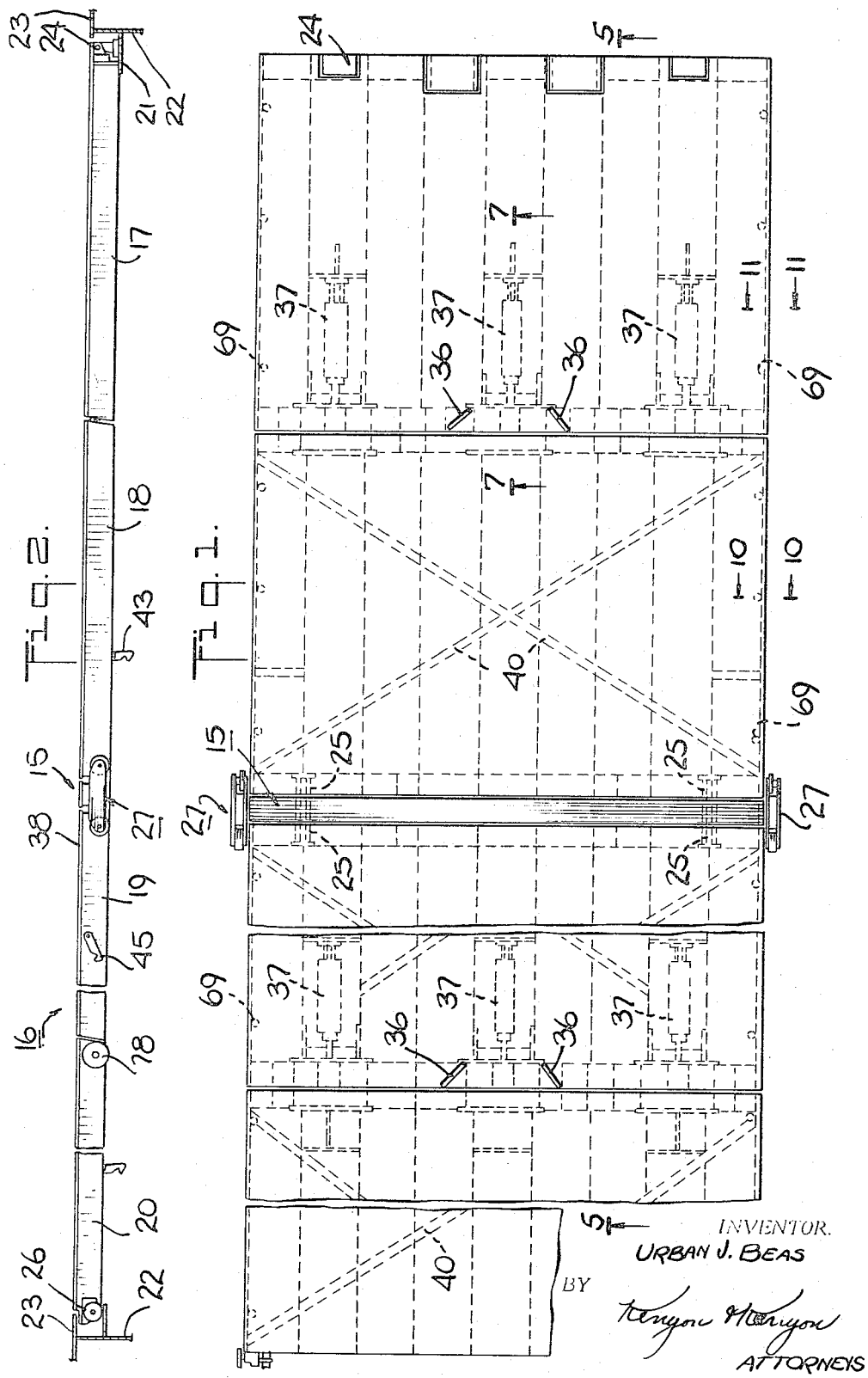
INVENTOR.
URBAN J. BEAS
BY Kenyon & Kenyon
ATTORNEYS

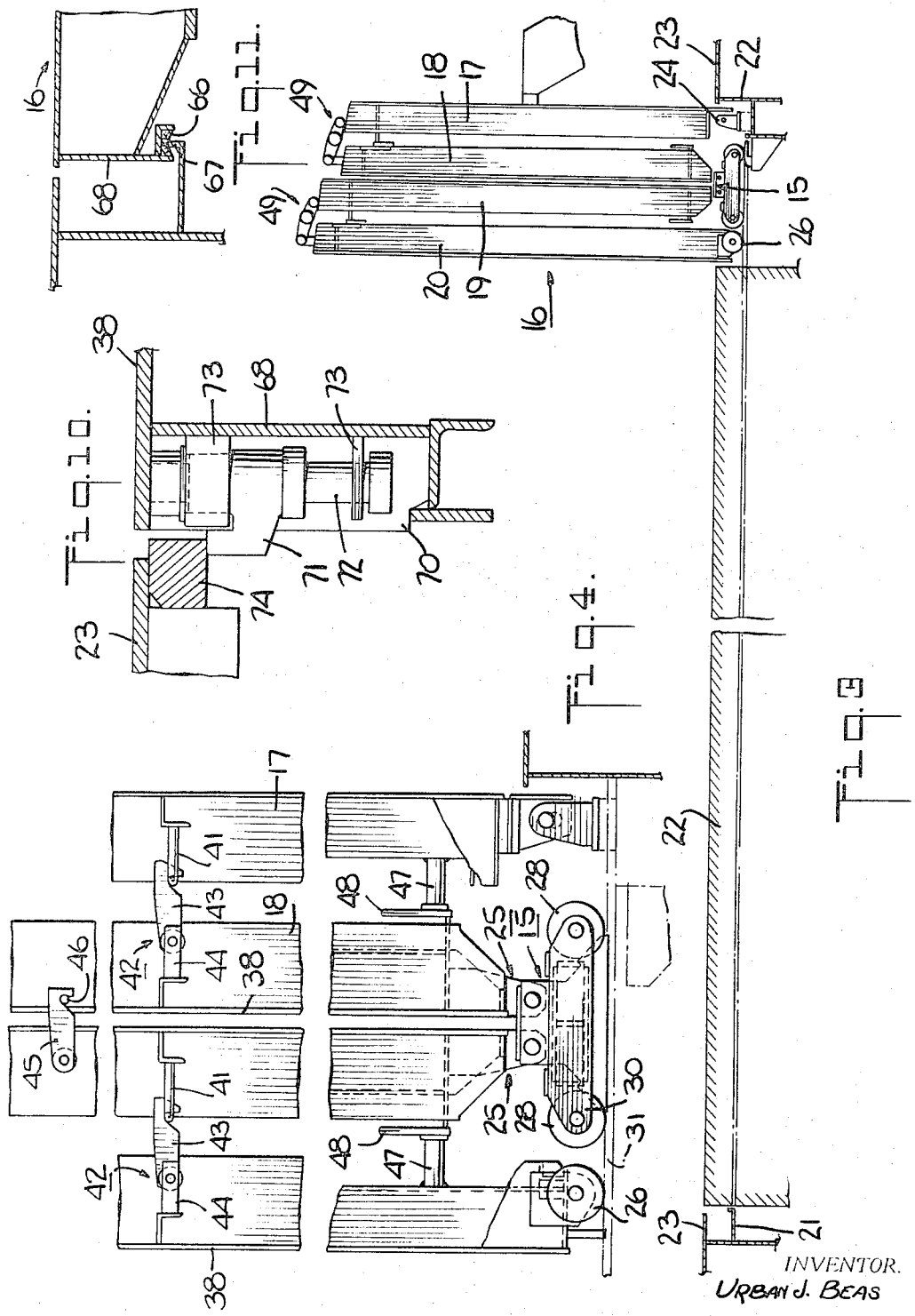

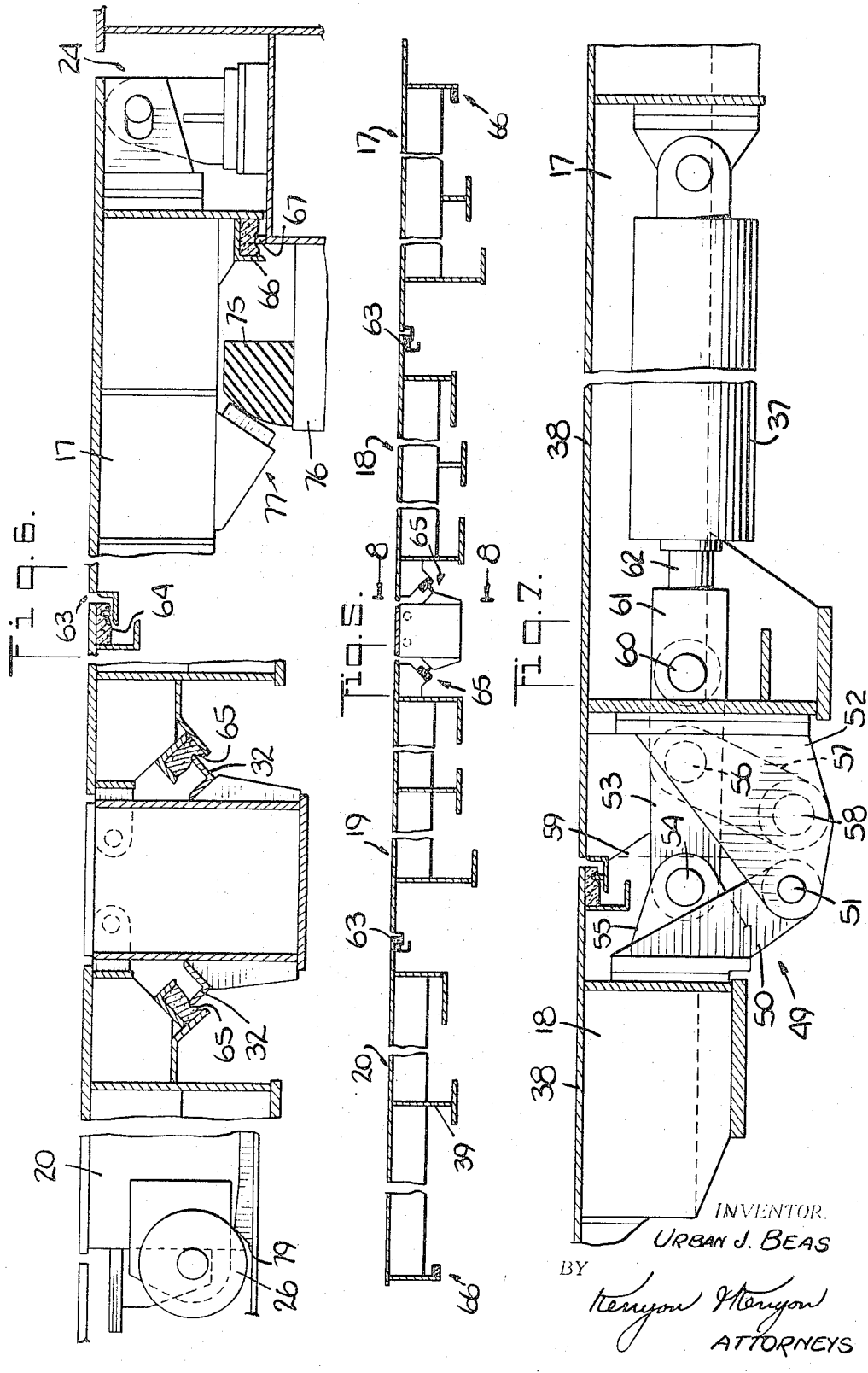

June 20, 1967 U. J. BEAS 3,326,169
HATCH COVER
Filed July 7, 1965 5 Sheets-Sheet 4
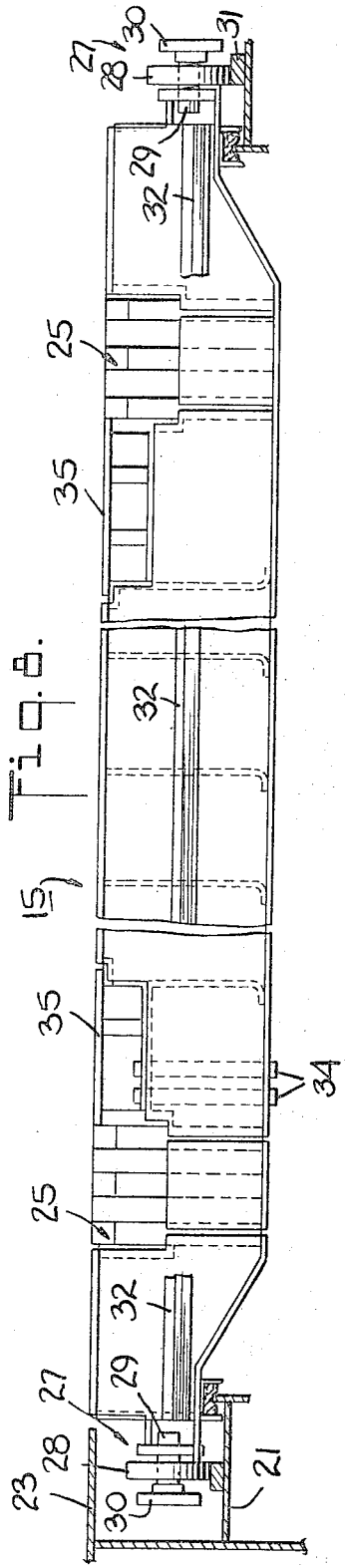
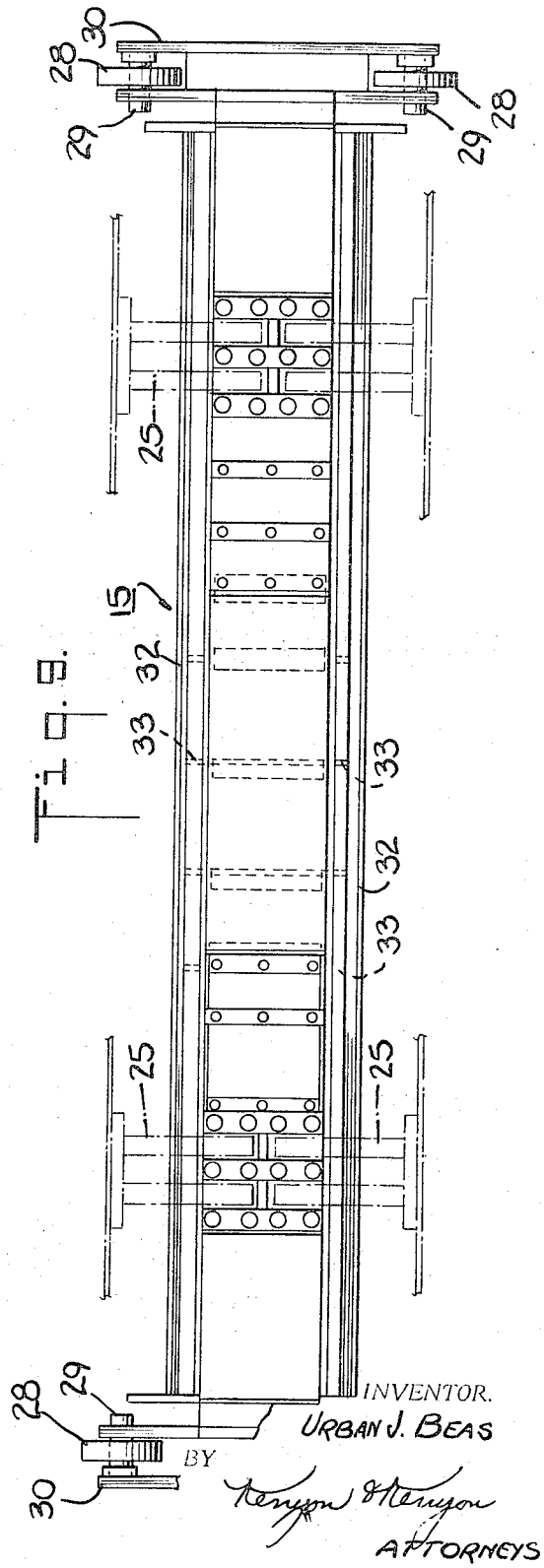
INVENTOR.
URBAN J. BEAS
BY
Kenyon & Kenyon
ATTORNEYS

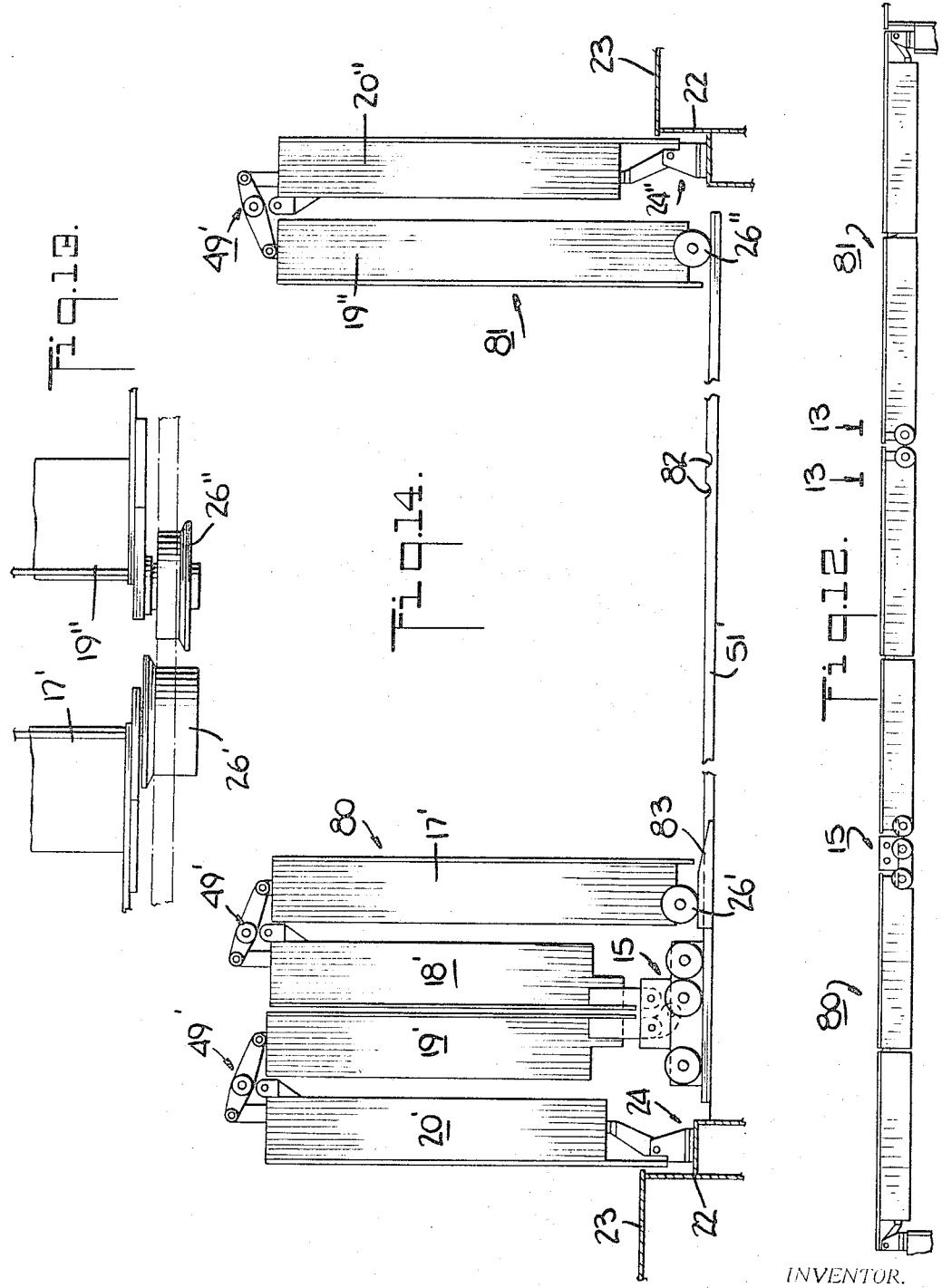

United States Patent Office 3,326,169
Patented June 20, 1967

3,326,169
HATCH COVER
Urban J. Beas, Scotch Plains, N.J., assignor to Mac-Gregor-Comarain, Incorporated, a corporation of New York
Filed July 7, 1965, Ser. No. 470,069
13 Claims. (Cl. 114—202)

This invention relates to a hatch cover. More particularly, this invention relates to multi-paneled hatch covers for ships and the like. Still more particularly, this invention relates to a traveling beam for multi-paneled hatch covers for ships and the like.

The closure of cargoholds on ships is often effected by hatch covers which are divided into panel sections articulated with each other. These hatch covers are usually referred to as folding-type hatch covers and are equipped with wheel assemblies running on rails along the cargohold opening for accomplishing their folding action. However, the wheel assemblies have projected out of the hatch covers to substantial degrees and have therefore required wide landing shelves on the sides of a hatch. Also, several of the heretofore used wheel assemblies have projected through the plane of the deck during operation of the hatch covers. Still another disadvantage in some of the heretofore used hatch covers is the inadequacy of the seals used to provide a flush watertight hatch cover.

This invention provides a folding-type hatch cover which incorporates a transversely extending means, that is, a traveling beam therein for permitting the hatch cover to be mounted on a narrow landing shelf around a hatch and also to be capable of being mounted within a recess at the sides of a hatch. The traveling beam pivotally mounts a pair of adjacent panel sections and extends across the mouth of the hatch. The ends of the traveling beam are movably mounted by wheel housings on a landing shelf below the deck of the ship.

The panel sections are folded by hydraulic assemblies which are mounted on the undersides and spaced across the width of the panels. When an even number of panel sections are incorporated in the folded hatch cover, the hydraulic assemblies are operably connected to adjacent panels; however, when an odd number of panel sections are incorporated, hydraulic assemblies are operably connected to the last panel and the traveling beam.

In addition, a sealing gasket is provided in the hatch cover between the respective panel sections, the panel sections and traveling beam, and at the edges of the cover for engagement with a knife edge on the landing shelf.

The traveling beam permits the wheel housings to remain below the deck level at all times and permits an improved positive acting gasket joint between the pairs of panels at the beam. By positive acting is meant that the gasket approach to the knife edge is substantially perpendicular and is the same during each operation, since the panel sections pivot around fixed points on the traveling beam. Also, the hatch cover, when in closed position, is flush with the deck and rests on the landing shelf to limit the depression of the sealing gasket on the knife edge.

Accordingly, it is an object of this invention to provide a multi-panel, watertight flush hatch cover that can be supported on a minimum sized landing shelf.

It is another object of this invention to provide a multi-panel flush hatch cover that can be supported in a recess at the sides of a hatch.

It is another object of this invention to provide a traveling beam in a folding-type hatch cover.

It is another object of this invention to provide a traveling beam in a sealed folding-type hatch cover.

It is another object of this invention to provide a folding-type hatch cover which is flush with the deck of a ship when in closed position over a hatch in the ship.

It is another object of this invention to provide a flush folding-type hatch cover which is movably mounted on a traveling beam mounted over a hatch of a ship and actuated by transversely spaced hydraulic assemblies.

These and other objects and advantages will become more apparent from the following detailed description taken in conjunction with the accompanying drawings in which:

FIG. 1 illustrates a plan view of a four panel hatch cover embodying the invention;

FIG. 2 illustrates a side view of the hatch cover of FIG. 1;

FIG. 3 illustrates a view of the hatch cover of FIG. 1 in open position;

FIG. 4 illustrates a view of a latch means for securing the hatch cover in the position of FIG. 3;

FIG. 5 illustrates a view taken at line 5—5 of FIG. 1;

FIG. 6 illustrates a part sectional view of the traveling beam and panel section seal joint shown in FIG. 5;

FIG. 7 illustrates a view taken at line 7—7 of FIG. 1;

FIG. 8 illustrates a view of the traveling beam taken at line 8—8 of FIG. 5;

FIG. 9 illustrates a plan view of FIG. 8;

FIG. 10 illustrates a view of a hatch cover locking mechanism taken at line 10—10 of FIG. 1;

FIG. 11 illustrates a view of a seal joint taken at line 11—11 of FIG. 1;

FIG. 12 illustrates another embodiment of the invention;

FIG. 13 illustrates a view taken at line 13—13 of FIG. 12;

FIG. 14 illustrates a view of the embodiment of FIG. 12 in open position.

Referring initially to FIGS. 1 and 2, the traveling beam 15 of the invention is embodied in a folding-type hatch cover 16 which is composed of four panel sections 17, 18, 19, 20. The hatch cover 16 is mounted on a landing shelf 21 which is of minimum dimension, for example, when used without a recess in the wall 22 of a hatch, the shelf 21 may project six inches or less; when used with a recess, there may be little or no projection of the shelf 21 into the hatch. The panels when in closed position are dimensioned to be flush with the deck 23 surrounding the hatch. The rearmost panel section 17 is pivotally mounted on a plurality of hinges 24 fixedly secured to the shelf 21 at one end of the hatch opening while the intermediate panel sections 18, 19 are pivotally secured to the traveling beam 15 by pivots 25. Each panel section of the pairs of panel sections 17, 18 and 19, 20 is pivotally secured to the other of the pair by conventional linkage assemblies. The forwardmost panel 20 mounts a wheel 26 on each side of its forward end which rolls on the shelf 21. Thus, a single articulated folded hatch cover is formed.

Referring to FIGS. 8 and 9, the travelling beam 15 like the panel sections extends across the mouth of the hatch from landing shelf to landing shelf; however, the traveling beam 15 is mounted at each end by a rotatable mount assembly means 27 on the shelf 21. The rotatable mount assembly 27 comprises a pair of rollers 28 movably mounted on suitable shafts 29 secured in the frame 30 of the assembly 27. The rollers 28 of the respective assemblies 27 roll on suitable tracks 31 secured on the shelf 21.

The traveling beam 15 is of a generally box-shaped cross-section to the exterior of which flanges 32 are secured. The flanges 32 which can be formed by angle members are welded to the sides of the beam 15 and suitably braced by stiffners 33. The traveling beam 15 is provided at intermediate internal points adjacent each pair of pivots 25 with suitable passage means for the actuation means for the linkage assemblies between panels. When hydraulic actuation means are used, the passage means includes a pair of hydraulic pipes 34 as well as a suitable hydraulic piping header (not shown) adjacent one pair of pivots 25 and a pair of hydraulic piping headers (not shown) adjacent the other pair of pivots 25. The beam 15 has covers 35 secured thereon for covering the passage means adjacent the pivots 25.

Referring again to FIGS. 1 and 2, the panel sections 17, 19 are provided with a pair of emergency lifting lug assemblies 36 which permit the hatch cover 16 to be manually moved into its open position. However, the hatch cover 16 is normally actuated automatically through hydraulic cylinders 37 in the linkage assemblies, the cylinders 37 being operated from outside the cover. The panel sections 17, 18, 19, 20 are made with flat surfaces which, for example, can be formed by plates 38 provided with suitable stiffner plates 39 (FIG. 5) and cross bracing 40 and which are flush with each other and the deck 23 when the hatch cover 16 is in closed position.

Referring to FIGS. 3 and 4, when the hatch cover 16 is in the open position latch means secure each of the upstanding panel sections to an adjacent panel section. For example, panel sections 17, 19 are each provided with a latch-receiving means 41 fixedly secured thereto, as by welding, and panel sections 18, 20 are each provided with a complementary latch means 42 which consists of a latch 43 pivotally mounted on a support 44 projecting from the surface plate 38. Panel section 19 is also provided with a pivotally mounted latch 45 which engages a suitable latch receiving means, such as a pin 46, on the panel section 18.

Each of the extreme panels 17, 20 are provided with pairs of bumpers 47 which are fixedly mounted thereon, as by welding. The bumpers 47 butt against a base portion 48 of the respective adjacent panel sections 18, 19 when the hatch cover 16 is latched in the open position.

Referring to FIG. 7, the linkage assemblies 49 permit the respective panel sections to rotate 180° with respect to each other. Any suitable linkage assembly can be used. For example, each of a pair of link arms 50 fixedly mounted on panel section 18 can be connected by a pivot pin 51 to a pair of link arms 52 fixedly mounted on panel section 17, the pivot axis thereby being the axis of pin 51. A link 53 is also pivotally mounted by a pin 54 on a support plate 55 in panel section 18 and is operably connected by a pin 56 to a link 57 which is pivotally mounted by a pin 58 to a support plate 59 in panel section 17. The link 53 is also connected by a pin 60 to a clevis 61 on piston 62 of the hydraulic cylinder 37. Accordingly, upon actuation of the piston 62 the linkage assembly 49 pivots one panel section with respect to the other about the axis of pin 51.

Referring to FIGS. 5, 6 and 11, the joints of the hatch cover 1 as well as the engaging portions of the hatch cover and hatch opening are provided with suitable watertight seals. The seals 63 between the panel sections 17, 18 and 19, 20 are secured, as by bonding, to one panel underside and is engaged by a flange 64 mounted on the other panel in a manner whereby the flange 64 is impressed into the seal 63 when the hatch cover 16 is in closed position. Similar seals 65 are secured in like manner to the undersides of panel sections 18, 19 to sealingly cooperate with the flanges 32 mounted on the traveling beam 15. A seal 66 is secured to the underside edges of the hatch cover 16 to cooperate with a knife edge flange 67 on the shelf 21. Thus, the hatch cover 16 completely seals the hatch opening from the outside. The seals 63, 65, 66 have a Neoprene sponge core for resilience which are covered with a sheet of Neoprene to withstand abrasion. The seals are fully retained on three sides and exposed to the respective flanges on the remaining side. The hatch cover 16 is constructed to so that when it is in closed position the surrounding side skirts 68 of the hatch cover 16 (see FIG. 11) rest on the shelf 21 to limit the amount of compression of the seals by the respective flanges 64, 32, 67.

Referring to FIGS. 1 and 10, a plurality of locking means 69 are rotatably mounted in suitable pockets formed by the skirts 68 of the panel sections, the surface plates 38 and side plates 70. Each locking means 69 is formed by a dog lug 71 fixedly mounted on a shaft 72 which is rotatably mounted in brackets 73 fixed to the skirts 68. When the locking means 69 are rotated into locking position, the lugs 71 abut stops 74 secured to the undersides of the deck plates 23 to prevent lifting of the respective panel sections.

Referring to FIG. 6, the shelf 21 mounts a pair of cams 75 from suitable brackets 76 for guiding corresponding bearing plate assemblies 77 mounted on the panel section 17 during pivoting of the panel section 17 on the hinge 24.

In order to provide further support for the hatch cover 16 when in closed position the panel sections 17, 19 can be each provided with a pair of rollers 78 (FIG. 1) for contacting the tracks 31 on the shelf 21. Also, the tracks 31 are each provided with a shouldered detent portion 79 (FIG. 6) against which the wheels 26 of the panel section 20 rest when the hatch cover 16 is in closed position. Further, the tracks 31 can be provided with a plurality of arcuate grooves into which the rollers of the traveling beam can fit when the hatch cover 16 is in closed position.

Referring finally to FIGS. 12, 13 and 14, the traveling beam 15 can be incorporated in a multi-panel hatch cover 80 which cooperates with a dual panel section hatch cover 81 of conventional design. The structures of these hatch covers 80, 81 are similar in many respects to the hatch cover 16 illustrated in FIGS. 1 through 11 and primed reference characters have been used to indicate similar parts. As shown in FIG. 13, the wheel 26' of the panel section 17 of hatch cover 80 is flanged in an opposed manner to the wheel 26" of the panel section 18" of hatch cover 81 so that a closer fit is obtained.

The joint between the hatch covers 80, 81 is sealed in a manner similar to the joint seals of hatch cover. Alternatively, where a water-tight seal is not required all the seals described above can be omitted.

As shown in FIG. 14, the tracks 51' have arcuate detents 82 for seating the rollers of the traveling beam 15 when the hatch cover is in closed position. A cam track 83 is also provided for the wheel 26' of the hatch cover 80 when the hatch cover 80 is in open position.

The hatch cover can also be modified to a three-paneled hatch cover or a two-paneled hatch cover while incorporating the traveling beam therein.

Having thus described the invention, it is intended that all matter contained in the foregoing description or shown in the accompanying drawings shall be interpreted as illustrative and not in a limiting sense.

What is claimed is:

1. In combination with a hatch having a deck plate surrounding the opening of said hatch and a narrow landing shelf spaced below said deck plate and projecting slightly into the hatch opening, said deck plate substantially covering said landing shelf, a hatch cover comprising a plurality of panels mounted on said landing shelf for vertical movement past said deck plate, and means extending transversely of the hatch cover between a pair of said panels for pivotally mounting said pair of panels thereon, said transversely extending means having a movable mount assembly means secured to each end thereof, each said mount assembly means projecting from said plurality of panels and being movably mounted on said landing shelf under said deck plate.

2. The combination as set forth in claim 1 wherein said hatch cover further comprises means for moving said transversely extending means longitudinally of said hatch cover whereby said panels can be brought into an upstanding position.

3. The combination as set forth in claim 2 wherein said moving means comprises automatically operated hydraulic cylinders.

4. The combination as set forth in claim 2 wherein said moving means comprises a pair of lugs in alternate panels.

5. The combination as set forth in claim 1 which further comprises a seal means mounted in each said panel for sealing said hatch cover relative to said landing shelf inside of said panels.

6. The combination as set forth in claim 1 which further comprises locking means rotatably mounted on said panels for engaging the underside of said deck plate.

7. In combination with a hatch having a deck plate and a landing shelf spaced below and under said deck plate, a hatch cover comprising a plurality of panels mounted on said landing shelf for vertical movement past said deck plate and means extending transversely of the hatch cover between a pair of said panels for pivotally mounting said pair of panels thereon, said transversely extending means having a movable mount assembly means secured to each end thereof, each said mount assembly means projecting from said plurality of panels and being movably mounted on said landing shelf under said deck plate, and means for pivotally mounting one of said panels on said landing shelf.

8. The combination as set forth in claim 7 which further includes first means for providing a seal between said hatch cover and said landing shelf, second means for providing a seal between said panels and third means for providing a seal between said traveling beam and said pair of panels.

9. The combination as set forth in claim 8 wherein a track is secured to each of opposite sides of said landing shelf and each said mount assembly means is movably mounted on one of said tracks.

10. The combination as set forth in claim 9 wherein each of said tracks includes a plurality of detents for seating a said mount assembly means therein.

11. In combination with a hatch having a deck plate and a landing shelf spaced below said deck plate and having a pair of tracks on opposite sides thereof under said deck plate, a hatch cover comprising a plurality of panels pivotally mounted with respect to each other on said landing shelf, a traveling beam extending transversely of the hatch cover between a pair of said panels for pivotally mounting said pair of panels thereon, said traveling beam having a movable mount assembly means secured to each end thereof, each said mount assembly means being movably mounted on said landing shelf under said deck plate, each of said mount assembly means including a pair of rollers mounted on one of said tracks, each of said tracks having a pair of detents therein for seating said pair of rollers whereby said mount assembly means are maintained in position when said hatch cover is in closed position.

12. The combination as set forth in claim 11 which further comprises latch means mounted on respective panels for securing said panels in upstanding position when said hatch cover is in open position.

13. The combination as set forth in claim 7 which further comprises a pair of rollers mounted on one of said panels at one end of the hatch cover for rolling on said landing shelf whereby upon folding of the hatch cover to an open position said panels are supported on said landing shelf on said mount assembly means and said pair of rollers.

References Cited

UNITED STATES PATENTS

| | | | |
|---|---|---|---|
| 2,707,928 | 5/1955 | Farrell | 114—203 |
| 2,788,849 | 4/1957 | Lingard | 160—188 |
| 2,932,272 | 4/1960 | Beas | 114—202 |
| 3,043,257 | 7/1962 | Appleton et al. | 114—202 |
| 3,114,346 | 12/1963 | Dahlin | 114—202 |
| 3,196,932 | 7/1965 | Rosendahl | 160—188 |

MILTON BUCHLER, *Primary Examiner.*

A. H. FARRELL, *Assistant Examiner.*